(12) United States Patent
Kondo et al.

(10) Patent No.: US 8,985,623 B2
(45) Date of Patent: Mar. 24, 2015

(54) STEERING WHEEL STRUCTURE WITH AIRBAG MODULE

(75) Inventors: Takashi Kondo, Wako (JP); Yukihiro Kunitake, Wako (JP); Kunitomo Miyahara, Wako (JP); Yutaka Hirota, Yokohama (JP); Yutaka Tsuchida, Yokohama (JP); Kunio Ohbayashi, Yokohama (JP); Hiroshi Takamori, Yokohama (JP); Koichi Akiyama, Yokohama (JP)

(73) Assignees: Autoliv Development AB, Vårgårda (SE); Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 13/821,845

(22) PCT Filed: Jul. 20, 2011

(86) PCT No.: PCT/JP2011/066415
§ 371 (c)(1),
(2), (4) Date: May 10, 2013

(87) PCT Pub. No.: WO2012/032860
PCT Pub. Date: Mar. 15, 2012

(65) Prior Publication Data
US 2013/0221641 A1    Aug. 29, 2013

(30) Foreign Application Priority Data

Sep. 9, 2010    (JP) .................................. 2010-202147

(51) Int. Cl.
*B60R 21/203*    (2006.01)
*B62D 7/22*    (2006.01)
*F16F 7/10*    (2006.01)

(52) U.S. Cl.
CPC ......... *B60R 21/2035* (2013.01); *B60R 21/2037* (2013.01); *B62D 7/222* (2013.01); *F16F 7/1028* (2013.01)
USPC ....................................................... 280/731

(58) Field of Classification Search
CPC .................................................. B60R 21/2037
USPC ....................................................... 280/731
See application file for complete search history.

(56) References Cited

U.S. PATENT DOCUMENTS

| 5,303,952 | A | * | 4/1994 | Shermetaro et al. | 280/731 |
| 5,410,114 | A | * | 4/1995 | Furuie et al. | 200/61.55 |
| 6,062,592 | A | * | 5/2000 | Sakurai et al. | 280/728.2 |

(Continued)

FOREIGN PATENT DOCUMENTS

| JP | 2006096127 | 4/2006 |
| JP | 2009202859 | 9/2009 |

OTHER PUBLICATIONS

International Search Report of PCT/JP2011/066415 Mailed on Nov. 1, 2011 (3 pages).

*Primary Examiner* — Nicole Verley
(74) *Attorney, Agent, or Firm* — Brinks Gilson & Lione

(57) ABSTRACT

A steering wheel structure with an airbag module having a horn bracket fixed to a steering wheel, an airbag module having an inflator and serving as a weight, a spring unit installed between the airbag module and the horn bracket and transmitting vibrations of the steering wheel to the airbag module for configuring a dynamic damper. The spring unit including an elastic body that transmits the vibrations and a protector attached to the horn bracket and housing the elastic body therein in an elastically deformable manner.

17 Claims, 14 Drawing Sheets

(56) References Cited

U.S. PATENT DOCUMENTS

| | | | |
|---|---|---|---|
| 6,139,051 A * | 10/2000 | Fujita | 280/731 |
| 6,299,201 B1 * | 10/2001 | Fujita | 280/731 |
| 6,439,599 B1 | 8/2002 | Laue et al. | |
| 6,478,330 B2 * | 11/2002 | Fujita | 280/731 |
| 6,508,485 B2 * | 1/2003 | Kikuta et al. | 280/728.2 |
| 7,694,997 B2 * | 4/2010 | Burghardt et al. | 280/728.2 |
| 8,256,797 B2 * | 9/2012 | Sakurai et al. | 280/731 |
| 8,286,766 B2 * | 10/2012 | Terada et al. | 188/379 |
| 8,342,567 B2 * | 1/2013 | Sasaki et al. | 280/728.2 |
| 8,556,292 B2 * | 10/2013 | Umemura et al. | 280/731 |
| 8,616,577 B1 * | 12/2013 | Matsu et al. | 280/728.2 |
| 2004/0004344 A1 * | 1/2004 | Kim et al. | 280/731 |
| 2004/0100078 A1 * | 5/2004 | Schutz et al. | 280/731 |
| 2005/0151354 A1 * | 7/2005 | Sugimoto | 280/731 |
| 2009/0218739 A1 * | 9/2009 | Terada et al. | 267/2 |
| 2010/0219621 A1 * | 9/2010 | Sasaki et al. | 280/731 |
| 2013/0026741 A1 * | 1/2013 | Onohara | 280/731 |

\* cited by examiner (b)

(a)

(a)

(b)

STEERING WHEEL STRUCTURE WITH AIRBAG MODULE

BACKGROUND

1. Field of the Invention

The present invention relates to a steering wheel structure with an airbag module which can protect a spring element of a dynamic damper from damage and increase productivity by improving assemblability.

2. Related Art

Known techniques which use an airbag module as a dynamic damper to reduce vibrations of a steering wheel includes a technique of Patent Literature 1. In "a steering wheel equipped with an airbag module" according to Patent Literature 1, the airbag module equipped with a gas generator and an airbag, and hidden from a passenger compartment by a cover cap provided on a top face of the steering wheel. The gas generator is provided in the form of a vibration damper, and is mounted on at least one member in the airbag module, the member being elastically deformable when the steering wheel vibrates. The gas generator is peripherally mounted on the elastically deformable member, and/or the elastically deformable member has a peripheral sealing lip, which abuts the member or another member coupled to the member after the gas generator ignites.

According to one reference in the patent literature, the elastically deformable member is a rubber ring or elastic member made of rubber, and the rubber ring or the like is fitted over a plate flange of the gas generator, which is usually made of metal, using a slot formed in the rubber ring or the like.

The above construction is seen in Japanese Patent Application No. 2002-524352.

SUMMARY OF INVENTION

In the background art, the rubber ring or the like which serves as a spring element for the dynamic damper is mounted by being fitted directly over the plate flange made of metal. When transmitting vibrations between the steering wheel and airbag module, the rubber ring or the like oscillates with respect to the flange by compressive action. There is a problem in that the rubber ring or the like could be scraped or the like by the oscillation, suffering damage to its mounting portion and resulting in a need for maintenance, such as rubber ring replacement, as appropriate.

Also, there is a problem in that the rubber ring made of rubber is unstable in form, and thus is complex to mount on the flange, resulting in poor assemblability and low productivity.

The present invention has been made in view of the conventional problems described above and has an object to provide a steering wheel structure with an airbag module which can protect a spring element of a dynamic damper from damage and increase productivity by improving assemblability.

A steering wheel structure with an airbag module according to the present invention comprises: a horn bracket fixed to a steering wheel; an airbag module having an inflator and serving as a weight; a spring unit installed between the airbag module and the horn bracket and adapted to transmit vibrations of the steering wheel to the airbag module, the spring unit configuring a dynamic damper, wherein the spring unit includes an elastic body adapted to transmit the vibrations, and a protector made of synthetic resin, attached to one of the horn bracket and the airbag module, and adapted to house the elastic body therein in an elastically deformable manner.

Preferably a plurality of the spring units are disposed at intervals in a circumferential direction of the steering wheel.

Preferably the elastic body has different elastic characteristics between up-and-down direction and left-to-right direction of the steering wheel.

Preferably the protector includes an outer shell surrounding the elastic body and having a first planar portion adapted to support one end of the elastic body, and an inner slider installed slidably in the outer shell and having a second planar portion adapted to support another end of the elastic body.

Preferably the outer shell includes a shell piece adapted to hold the elastic body, and a holder piece configured to form the first planar portion; and a restraining mechanism adapted to restrain the inner slider to the holder piece is installed between the holder piece and the inner slider which support opposite ends of the elastic body on the first planar portion and the second planar portion.

Preferably the shell piece is formed into a hollow cylindrical body adapted to surround the elastic body; and the elastic body is held to the shell piece via engagement flanges formed on opposite ends of the elastic body and adapted to sandwich the shell piece.

Preferably the elastic body is formed into a hollow cylindrical body; and the restraining mechanism includes a bent portion configured to be flexible and deformable, formed on the inner slider, and extended to the side of the first planar portion by penetrating inner part of the elastic body, and a hook formed at a tip of the bent portion and restrained to the holder piece.

Preferably the steering wheel structure with an airbag module further comprises: a horn cover fitted with the airbag module and configured to be pressed toward the horn bracket when the horn is operated; a horn contact mechanism installed between the airbag module and the horn bracket and adapted to produce a horn sound by being openably closed; a spring resting surface installed on the protector attached to one of the horn bracket and the airbag module; and a horn spring installed between the spring resting surface and the other of the horn bracket and the airbag module, and adapted to close the horn contact mechanism by being elastically deformed when the horn is operated, while lifting the horn contact mechanism in an opening direction.

Preferably the steering wheel structure with an airbag module further comprises: a guide hole formed along a lifting direction of the horn spring by penetrating the spring unit attached to one of the horn bracket and the airbag module; and a guide stem slidably passed through the guide hole, and having one end detachably restrained to the spring unit and another end coupled to the other of the horn bracket and the airbag module, the guide stem adapted to guide elastic deformation of the horn spring while sliding in the guide hole.

The steering wheel structure with an airbag module according to the present invention can protect a spring element of a dynamic damper from damage and increase productivity by improving assemblability.

DETAILED DESCRIPTION

Figure 1:
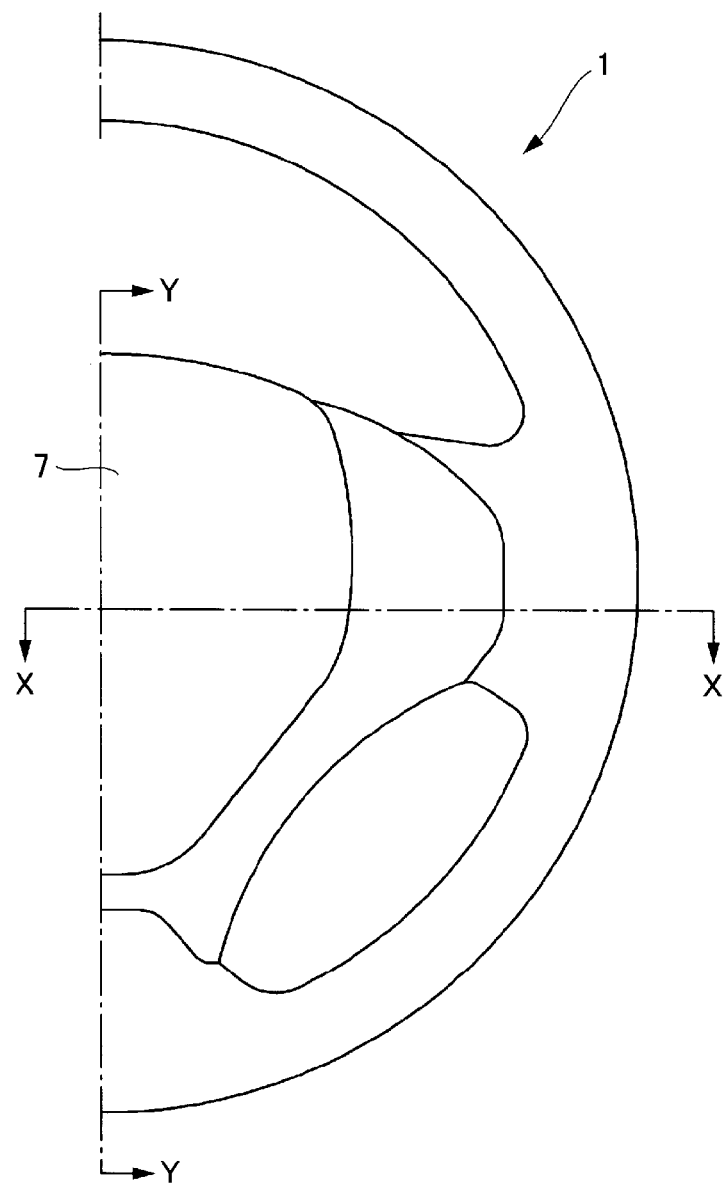
FIG. 1 is a partial cutaway plan view of a steering wheel showing a preferred embodiment of a steering wheel structure with an airbag module incorporating the principles of the present invention.
Figure 2:
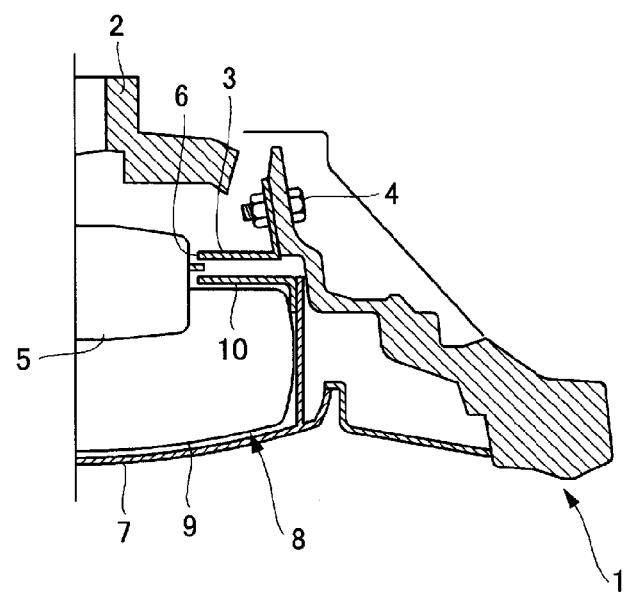
FIG. 2 is a sectional view taken along line X-X in FIG. 1.
Figure 3:
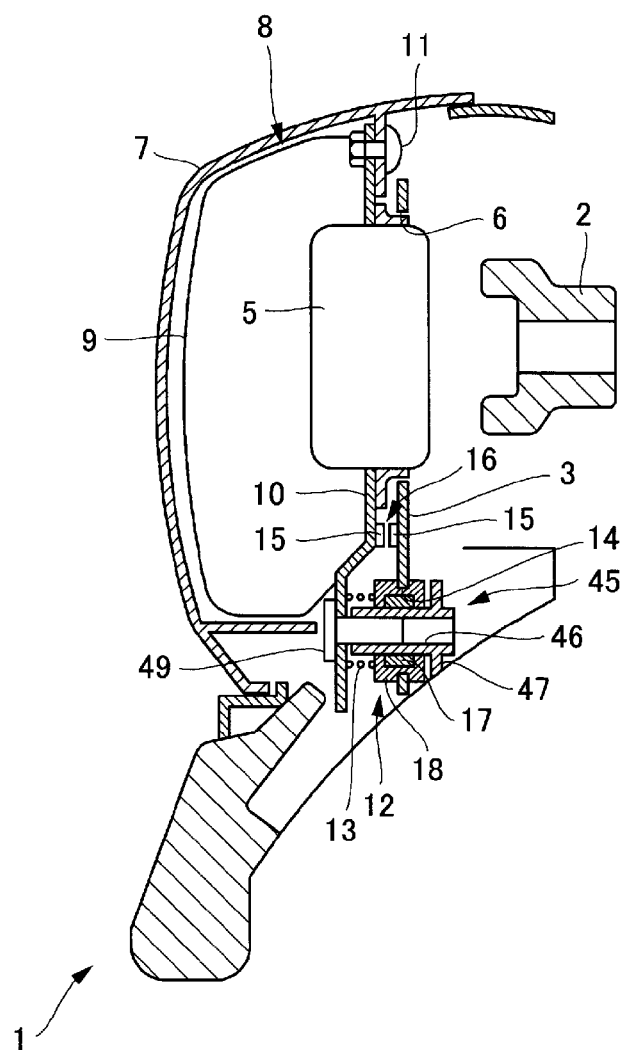
FIG. 3 is a sectional view taken along line Y-Y in FIG. 1.

A preferred embodiment of a steering wheel structure with an airbag module according to the present invention will be described in detail below with reference to the accompanying drawings. As shown in FIGS. 1 to 3, a steering wheel 1 is, for example, annular in external contour and a boss unit 2 is installed in the steering wheel 1 and coupled to a steering shaft (not shown) to allow a driver to turn the steering wheel 1 for steering. Engine vibrations as well as vibrations from road surfaces are transmitted to the steering wheel 1 via the steering shaft.

The steering wheel 1 is placed closer to a driver seat (not shown) than is the boss unit 2 and a horn bracket 3 formed from a metal plate is fastened with a bolt 4. An opening 6 is formed in the horn bracket 3 to secure installation space for an inflator 5 described later and harness wiring (see FIG. 7).

A horn cover 7 is slidably installed on the steering wheel 1, covering the boss unit 2 and horn bracket 3. The horn cover 7 is pressed toward the horn bracket 3 from the side of the driver seat when the horn is operated and thereby slidably moves with respect to the steering wheel 1. An airbag module 8 is mounted in the horn cover 7 by being covered with the horn cover 7. The airbag module 8 is placed between the horn cover 7 and horn bracket 3. The airbag module 8 slidably moves with respect to the steering wheel 1 together with the horn cover 7.

The airbag module 8 mainly includes an airbag 9 in a folded state, the inflator 5 adapted to unfold and expand the airbag 9 by ejecting inflation gas, and an airbag housing 10 adapted to internally house the airbag 9 and used to fixedly mount the inflator 5.

The inflator 5 is a heavy object made of metal, and when incorporated into the airbag module 8, causes the airbag module 8 as a whole to serve as a weight (mass) for a dynamic damper. The airbag module 8 is mounted as the airbag housing 10 is joined to the horn cover 7 with rivets or the like.

A spring unit 12 is installed as an integral part between the airbag module 8 and horn bracket 3. Being interposed between the horn bracket 3 which is fixed to the steering wheel 1 and the airbag module 8 on which the horn cover 7 is mounted slidably with respect to the steering wheel 1, the spring unit 12 transmits vibrations of the steering wheel 1 to the airbag module 8. At the same time, with its elastic action and attenuation effect, the spring unit 12, together with the airbag module 8, makes up the dynamic damper adapted to attenuate vibrations of the steering wheel 1.

According to the present embodiment, the spring unit 12 is attached to the horn bracket 3, coupled to the airbag housing 10 of the airbag module 8 via a horn spring 13 described later, and consequently installed between the airbag module 8 and horn bracket 3. The spring unit 12 may be attached to the airbag housing 10 and coupled to the horn bracket 3 via the horn spring 13.

Figure 7:
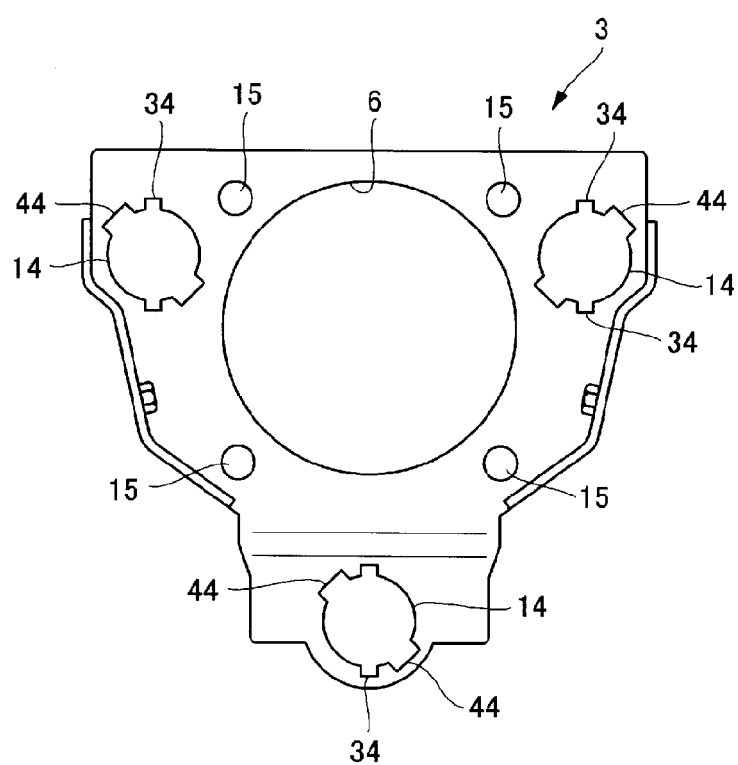
FIG. 7 is a plan view of a horn bracket applied to the steering wheel structure with an airbag module shown in FIG. 1.

A plurality of the spring units 12 are disposed at intervals in a circumferential direction of the steering wheel 1 and inserted, respectively, into plural mounting holes 14 formed in the horn bracket 3 fixed in inner part of the annular steering wheel 1 as shown in FIG. 7.

A horn contact mechanism 16 is installed between the airbag housing 10 and horn bracket 3, being configured such that a contact point 15 provided on the airbag housing 10 and a contact point 15 provided on the horn bracket 3 move into or out of contact with each other by elastic deformation of the horn spring 13. When the contact is broken, the horn contact mechanism 16 becomes non-conductive, and when contact is made, the horn contact mechanism 16 becomes conductive and produces a horn sound.

The spring units 12 will be described with reference to FIGS. 4 to 6. Each of the spring units 12 mainly includes an elastic body 17 made of rubber or synthetic resin and adapted to transmit vibrations between the steering wheel 1 and airbag module 8 and a protector 18 made of synthetic resin and adapted to cover and protect the elastic body 17 from damage. The spring unit 12 is mounted on the horn bracket 3 via the protector 18 as the protector 18 is attached to the horn bracket 3. The elastic body 17 is housed inside the protector 18 in an elastically deformable manner as described later.

The elastic body 17 is formed into a hollow circular cylindrical body or a ring-shaped body with a circular, polygonal, or other similar external contour and is placed such that a through-hole 17a penetrating its inner part will face the airbag housing 10 from the side of the horn bracket 3. According to the present embodiment, the elastic body 17 is formed into a hollow circular cylindrical body or a ring-shaped body with a uniform thickness in a circumferential direction and is set to produce a uniform elastic action and damping action in an up-and-down direction and left-to-right direction of the steering wheel 1. A pair of engagement flanges 19 are formed at opposite ends in an axial direction of the elastic body 17, jutting outward in a radial direction. Plural notches 20 are formed in each engagement flange 19 at appropriate intervals in a circumferential direction by cutting off part of the engagement flange 19.

In the illustrated example, the notches 20 are formed at two diametrically opposite locations of the elastic body 17. The notches 20 make up a rotation limiting mechanism adapted to limit rotation of the elastic body 17 in a circumferential direction of the elastic body 17 within the protector 18.

The protector 18 mainly includes an outside shell 21 which forms an outer shell of the spring unit 12 and an inner slider 22 which is slidably installed inside the outside shell 21. The outside shell 21 in turn includes a shell piece 23 and a holder piece 24.

The shell piece 23 is formed into a hollow circular cylindrical body or a ring-shaped body which surrounds and holds the elastic body 17. A step 25 is formed in the shell piece 23 by expanding or reducing diameter size at an intermediate position in an axial direction of the shell piece 23 and a large-diameter portion 26 and small-diameter portion 27 are formed on opposite sides of the step 25.

When the elastic body 17 is inserted into the shell piece 23 from the large-diameter portion 26 toward the small-diameter portion 27, one of the engagement flanges 19 is engaged with the step 25 and the other engagement flange 19 is engaged with an end of the shell piece 23 by getting out of the small-diameter portion 27. As the small-diameter portion 27 of the shell piece 23 is sandwiched by the engagement flanges 19, the elastic body 17 is held by the shell piece 23 via the engagement flanges 19.

Limiting protrusions 28 corresponding to the notches 20 formed in the elastic body 17 are formed in the large-diameter portion 26 of the shell piece 23, jutting radially inward to an inner circumferential position of the small-diameter portion 27. In the illustrated example, two limiting protrusions 28 are formed, corresponding to the two notches 20. The limiting protrusions 28 are engaged with the respective notches 20 in the circumferential direction of the elastic body 17. The limiting protrusions 28 of the shell piece 23 and the notches 20 of the elastic body 17 form the rotation limiting mechanism between the protector 18 and elastic body 17 to limit the rotation of the elastic body 17 in the protector 18.

Gripping strips 29 are formed at appropriate intervals in a circumferential direction on the small-diameter portion 27 of the shell piece 23, with a slight clearance S from the large-diameter portion 26, projecting in such a way as to jut outward from the large-diameter portion 26. In the illustrated example, in order to clarify a location where the gripping strip 29 is formed, the gripping strip 29 is shown as being formed at the location of the limiting protrusion 28 by projecting from the small-diameter portion 27. As described later, the gripping strip 29 makes up a grip mechanism adapted to grip the horn bracket 3 by pinching the horn bracket 3 in the clearance S between the gripping strip 29 and the large-diameter portion 26 of the shell piece 23.

A positioning strip 30 which makes up a positioning mechanism described later is formed on the shell piece 23. The positioning strip 30 is formed flexibly and deformably on the shell piece 23 and provided with a projection 31 at a tip. In the illustrated example, the positioning strip 30 is provided at a location where the limiting protrusion 28 is formed. Specifically, in the large-diameter portion 26 of the shell piece 23, depressions 32, concave inward in the radial direction, are formed at the locations of the limiting protrusions 28, the positioning strips 30 are formed in the depressions 32 via slits 33, and the projections 31 are formed, projecting outward from the small-diameter portion 27 of the shell piece 23 by being located in the clearance S between the gripping strips 29 and the large-diameter portion 26 which sandwich the horn bracket 3.

The projection 31 of each positioning strip 30 is installed slidably along an inner edge of the mounting hole 14, with the positioning strip 30 deforming elastically as the projection 31 is pressed against the inner edge. Being engaged with a stopper slot 34 of the horn bracket 3 described later, the projection 31 makes up a positioning mechanism adapted to position the spring unit 12 by blocking rotation of the spring unit 12 in the mounting hole 14 of the horn bracket 3.

The holder piece 24 is formed as a ring-shaped plate which has such an external contour as to fit inside the large-diameter portion 26 of the shell piece 23. Being laid over the elastic body 17 held by the shell piece 23 from the side of the large-diameter portion 26, the holder piece 24 makes up a first planar portion 35 adapted to support one end of the elastic body 17. In the holder piece 24, as with the engagement flange 19, recesses 36 adapted to engage with the limiting protrusions 28 are formed at the locations of the limiting protrusions 28, to prevent rotation of the holder piece 24 in the shell piece 23. The outside shell 21 is made up of the holder piece 24 serving as the first planar portion 35 and the shell piece 23 which surrounds and holds the elastic body 17.

The inner slider 22 is slidably installed in the outside shell 21 by being passed through inner part of the elastic body 17 from the side of the small-diameter portion 27 of the shell piece 23. The inner slider 22, which is slidable inside the elastic body 17, supports the elastic body 17 from inside using an outer surface of the inner slider 22. On the inner slider 22, a second planar portion 37 is formed at the end on the side of the small-diameter portion 27, the second planar portion 37 being adapted to support the other end of the elastic body 17 by being laid over the elastic body 17 from the side opposite the first planar portion 35.

Since the inner slider 22 provided with the second planar portion 37 is installed slidably with respect to the elastic body 17 (outside shell 21), the elastic body 17 held by the outside shell 21 is configured to be slidable between the first planar portion 35 (the holder piece 24) and second planar portion 37 while being subjected to vibrations from both the first planar portion 35 and second planar portion 37 and is housed inside the protector 18 in an elastically deformable manner. Furthermore, a spring resting surface 38 for the horn spring 13 is formed on the second planar portion 37, facing the outer side of the outside shell 21. Furthermore, ribs 39 adapted to hold down the elastic body 17 are formed on the first planar portion 35 and second planar portion 37.

The inner slider 22 is equipped with a restraining mechanism adapted to restrain the inner slider 22 to the holder piece 24 in assembling the inner slider 22 onto the outside shell 21. The restraining mechanism includes a bent portion 40 configured to be flexible and deformable and formed on the inner slider 22 by extending to the side of the holder piece 24 and restraining hooks 41 formed at extended ends of the bent portion 40.

As the restraining hooks 41 restrain the holder piece 24 with the bent portion 40 deforming elastically, the elastic body 17 held on the shell piece 23 is pinched between the first and second planar portions 35 and 37, causing the inner slider 22 to be assembled to the outside shell 21 via the holder piece 24 and elastic body 17 by the pinching action. Also, the restraining mechanism which restrains the holder piece 24 with the restraining hooks 41 causes the elastic body 17 which transmits vibrations by deforming elastically to be squeezed between the first and second planar portions 35 and 37, applying an initial compression load to the elastic body 17.

In the illustrated example, the bent portion 40 has a two-prong shape which penetrates inner part of the holder piece 24 while the restraining hooks 41 are hook-shaped to draw the holder piece 24 to the side of the second planar portion 37 and are exposed outside the holder piece 24. As the restraining mechanism, a hook adapted to restrain the inner slider 22 may be provided on the holder piece 24 or a mechanism for restraining the holder piece 24 and inner slider 22 to each other may be provided on both the holder piece 24 and inner slider 22.

A stopper mechanism adapted to limit an amount of compressive deformation of the elastic body 17 is provided between the second planar portion 37 of the inner slider 22 and shell piece 23 of the outside shell 21. The stopper mechanism includes a first stopper unit 42 formed on the second planar portion 37 by being placed outside the engagement flanges 19 of the elastic body 17 and facing the shell piece 23, and a second stopper unit 43 formed on the shell piece 23 by being spaced away (by a permissible amount of compressive deformation of the elastic body 17) form the first stopper unit 42.

The first and second stopper units 42 and 43 are designed to come into abutment with each other along with the compressive deformation of the elastic body 17 and thereby prevent the elastic body 17 from being compressively deformed in excess any more. In the illustrated example, the first stopper unit 42 has a convex shape while the second stopper unit 43 doubles as the gripping strips 29. The second stopper unit 43 may be formed as a dedicated part at a location different from those of the gripping strips 29. Alternatively, the second stopper unit 43 may be formed into a convex shape with the first stopper unit 42 combining the second planar portion 37.

Figure 4:
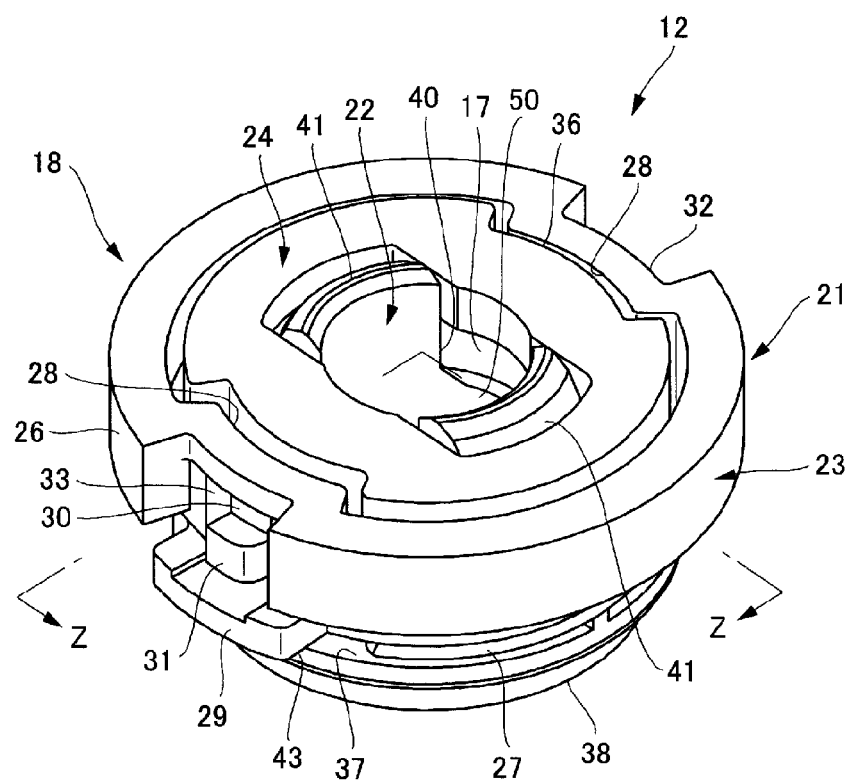
FIG. 4 is a perspective view of a spring unit applied to the steering wheel structure with an airbag module shown in FIG. 1.
Figure 5:
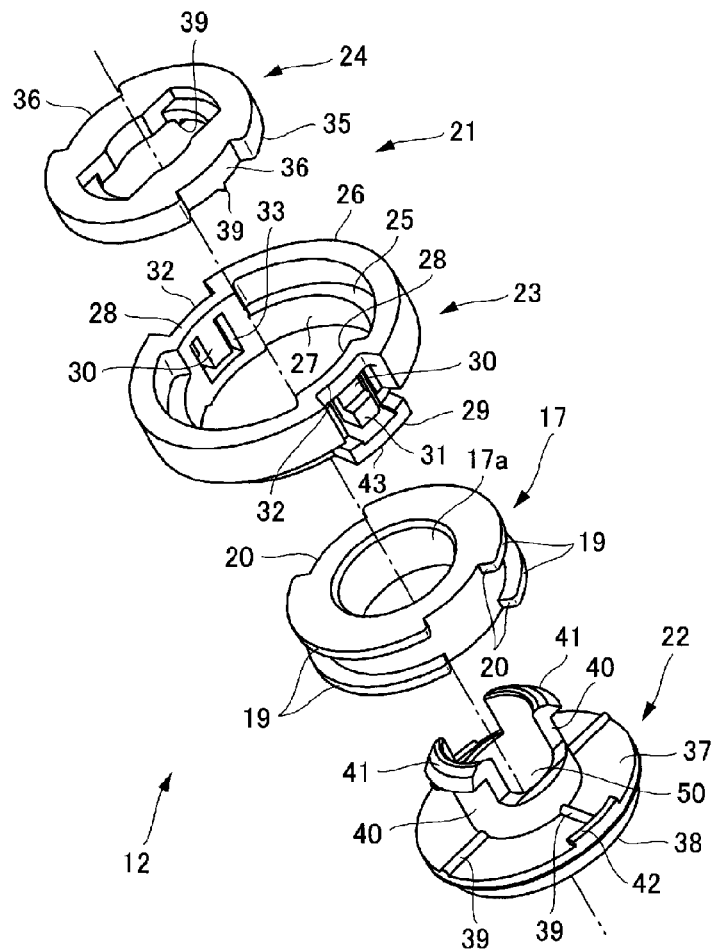
FIG. 5 is an exploded perspective view of the spring unit shown in FIG. 4.

The protector 18 is made up of the outside shell 21 (shell piece 23 and holder piece 24) and inner slider 22, and the spring unit 12 is configured as an integral part, as shown in FIG. 4, by housing the elastic body 17 in the protector 18.

Figure 8:
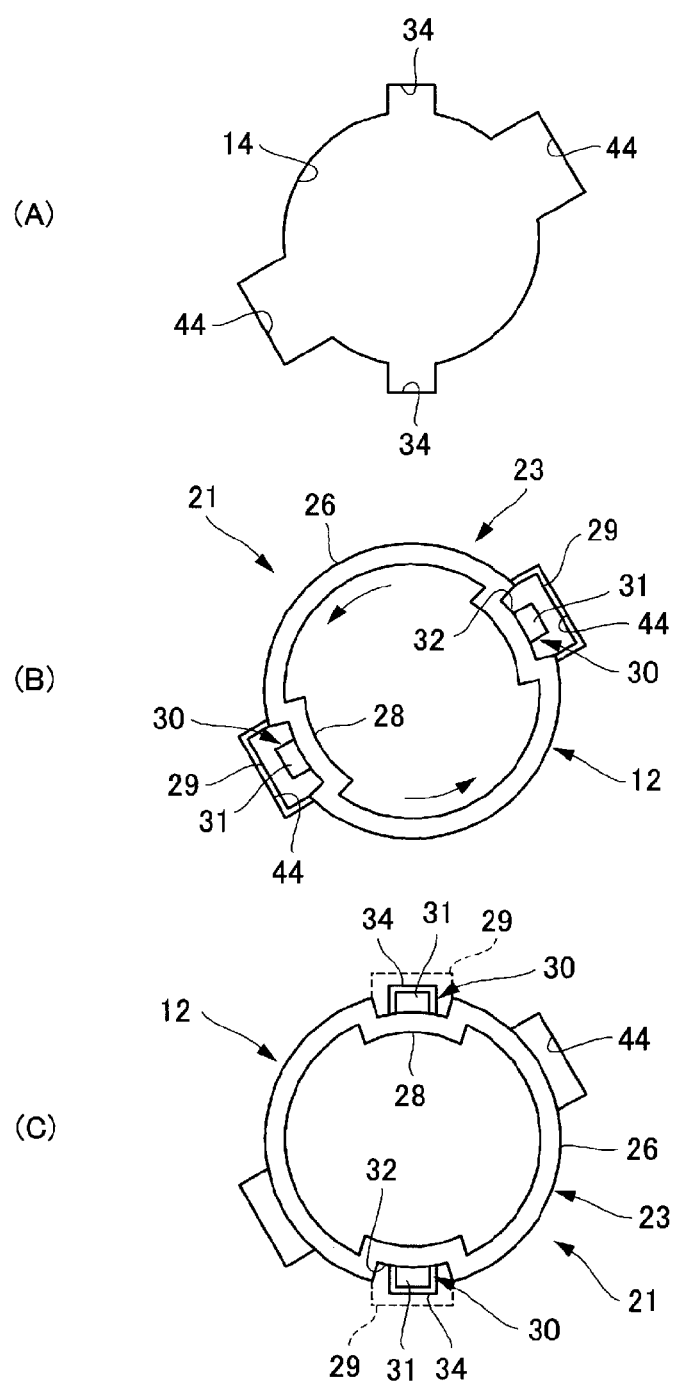
FIGS. 8(A) to 8(C) are explanatory diagrams illustrating how the spring unit is attached to the horn bracket shown in FIG. 7.

A mounting structure used to mount the spring units 12 on the horn bracket 3 will be described with reference to FIGS. 7 and 8. Circular mounting holes 14 are formed at mounting locations of the spring units 12 in the horn bracket 3. Inside diameter size of each mounting hole is set to suit outside diameter size of the small-diameter portion 27 in the shell piece 23 of the spring unit 12. Therefore, the spring unit 12 is installed rotatably along the inner edge of the mounting hole 14 via the small-diameter portion 27 inserted into the mounting hole 14, with the large-diameter portion 26 of the shell piece 23 being placed on one of front and rear faces of the horn bracket 3, projecting therefrom.

In the mounting hole, as shown in FIG. 8(A), insertion slots 44 for use to insert the gripping strips 29 are formed at locations corresponding to locations of the gripping strips 29 of the spring unit 12 by expanding the mounting hole outward from the inner edge of the mounting hole. As shown in FIG. 8(B), when the gripping strips 29 are inserted into the insertion slots 44 and the spring unit 12 is turned along the inner edge of the mounting hole 14, the horn bracket 3 is pinched in the clearance S between the gripping strips 29 and the large-diameter portion 26 of the shell piece 23 as shown in FIG. 8(C) and gripped by the gripping strips 29 and the large-diameter portion 26 (see FIG. 6). Consequently, the spring unit 12 is attached to the horn bracket 3 at a strength high enough to withstand the pressure of the unfolding and expanding airbag 9.

Furthermore, as shown in FIG. 8(A), stopper slots 34 are formed in the mounting hole 14, being spaced away from the insertion slots 44 in the circumferential direction by expanding the mounting hole 14 outward from the inner edge of the mounting hole 14, where the stopper slots 34 are adapted to get engaged with the positioning strips 30 of the spring unit 12, block the rotation of the spring unit 12, and thereby position the spring unit 12. The stopper slots 34 are designed to be smaller in size than the gripping strips 29 to prevent the gripping strips 29 from falling off the horn bracket 3.

According to the present embodiment, the positioning strips 30 are formed together with the gripping strips 29, at the locations of the limiting protrusions 28, and when the gripping strips 29 are inserted into the insertion slots 44, the positioning strips 30 each provided with the projection 31 are also placed in the insertion slots 44.

The projections 31 face the clearance S between the gripping strips 29 and the large-diameter portion 26, i.e., an end edge (the inner edge of the mounting hole 14) of the horn bracket 3 gripped in the clearance S. When the spring unit 12 is turned along the inner edge of the mounting hole 14 as shown in FIG. 8(B), the projections 31 get pushed against the inner edge of the mounting hole 14, and thereby retreat inward in the radial direction of the shell piece 23, being accompanied by flexible deformation of the positioning strips 30, and slide along the inner edge of the mounting hole 14. While the spring unit 12 is being turned along the inner edge of the mounting hole 14, when the positioning strips 30 reach the locations of the stopper slots 34, the projections 31 advance into the stopper slots 34, and consequently the positioning strips 30 get engaged with the stopper slots 34 as shown in FIG. 8(C), blocking further rotation of the spring unit 12 and thereby positioning the spring unit 12.

In the illustrated example, both the gripping strip 29 and positioning strip 30 are formed at the location of each limiting protrusion 28 and the gripping strip 29 and the like are inserted together into the same insertion slot 44. However, if the gripping strips 29 and positioning strips 30 are formed at different locations, additional slots for use to insert the positioning strips 30 are formed in the mounting hole 14.

Figure 6:
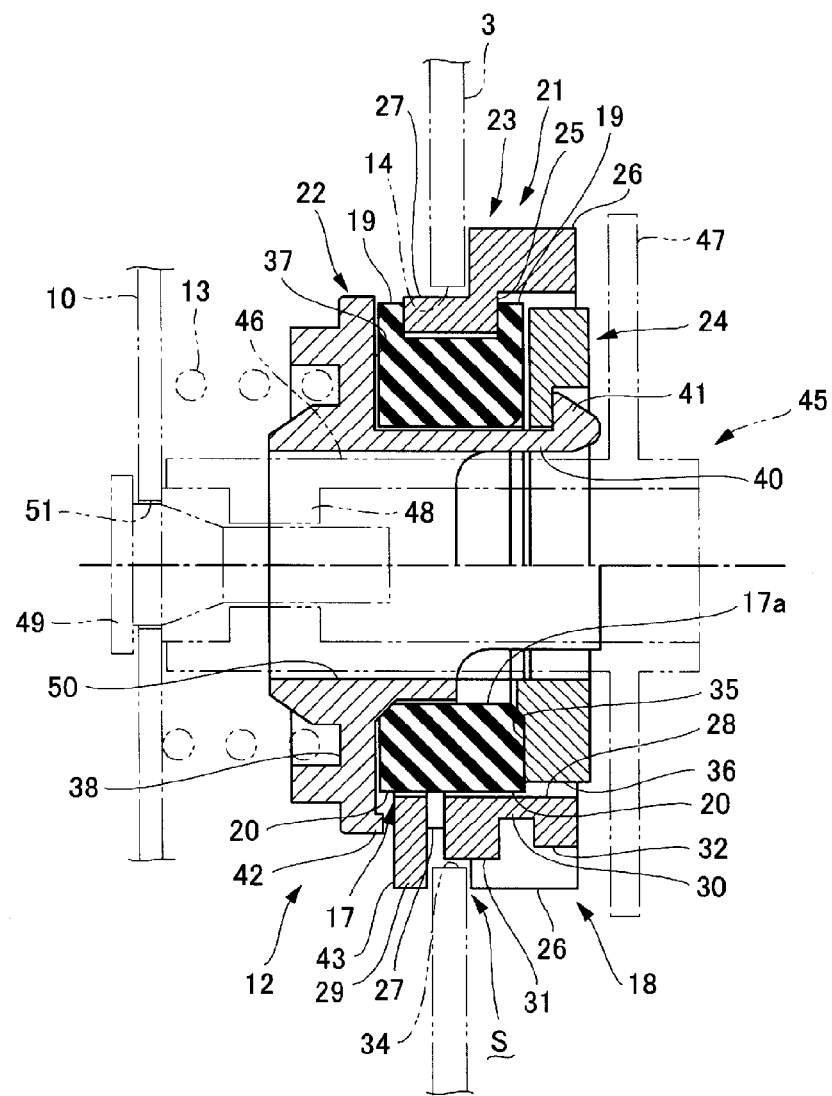
FIG. 6 is a sectional view taken along line Z-Z in FIG. 4.

In the steering wheel structure with an airbag module according to the present embodiment, as shown in FIGS. 3 and 6, the spring units 12 are provided with a mechanism for use to operate the horn. The mechanism mainly includes the horn spring 13 described above, and a guide stem 45 adapted to guide the elastic deformation of the horn spring 13 and thereby appropriately move the airbag housing 10 toward the horn bracket 3.

The horn spring 13 is a coil spring installed in an elastically deformable manner between the above-described spring resting surface 38 formed on the second planar portion 37 of the protector 18 and the airbag housing 10 of the airbag module 8. The horn spring 13 is compressed by the airbag housing 10 of the airbag module 8 moving toward the horn bracket 3 together with the horn cover 7 pressed to operate the horn, and pushes back the horn cover 7 together with the airbag housing 10 when the horn is deactivated. When the horn spring 13 is compressively deformed, the contact points 15 of the horn contact mechanism 16 are brought into contact with each other, producing a horn sound. When the horn spring 13 is restored elastically, the contact points 15 of the horn contact mechanism 16 are separated.

The horn spring 13 and the elastic bodies 17 of the spring units 12 make up a serial spring system in which springs are arranged serially. Elastic characteristics of the horn spring 13 involved in operation of the horn and elastic characteristics of the elastic bodies 17 of the dynamic damper can be adjusted separately and independently of each other.

The guide stem 45 includes a stem body 46 formed into a hollow cylindrical body, a restraining portion 47 formed into a flange shape at one end of the stem body 46 and detachably restrained to the first planar portions 35 of the spring units 12, a nut 48 formed inside the stem body 46, and a threaded member 49 used to couple the stem body 46 to the airbag housing 10 of the airbag module 8. A guide hole 50 is formed in the inner slider 22 of each spring unit 12 by penetrating the inner slider 22 to slidably pass the stem body 46 through inner part of the inner slider 22 along a bouncing direction of the horn spring 13.

The guide stem 45 is assembled to the spring units 12 as follows: the stem body 46 is passed is through the guide holes 50 in the inner sliders 22 of the spring units 12 mounted on the horn bracket 3, from the side of the first planar portion 35, the threaded member 49 passed through a passage hole 51 in the airbag housing 10 is inserted into the stem body 46 from the side of the second planar portion 37, with the horn spring 13 mounted between the airbag housing 10 and spring units 12, and the threaded member 49 is screwed into the nut 48 of the stem body 46 by rotating the restraining portion 47.

When the airbag housing 10 moves close to and away from the horn bracket 3 along with the elastic deformation of the horn spring 13, the stem body 46 slidably moves in a stable manner by being guided by the guide holes 50 in the inner sliders 22, and consequently the restraining portion 47 moves close to and away from the first planar portions 35, appropriately guiding the elastic deformation of the horn spring 13 during operation of the horn and thereby ensuring stable operability of the horn.

Next, operation of the steering wheel structure with an airbag module according to the present embodiment will be described. Since the spring units 12 installed between the horn bracket 3 fixed to the steering wheel 1 and the airbag module 8 serving as a weight are configured by housing the elastic bodies 17 in the protectors 18 made of synthetic resin in an elastically deformable manner and the elastic bodies 17 transmit vibrations of the steering wheel 1 to the airbag module 8 by deforming elastically, the dynamic damper can be configured using the airbag module 8, making it possible to reduce the vibrations of the steering wheel 1 effectively.

Regarding operation of the horn, when the horn cover 7 is pressed, the airbag module 8 moves toward the horn bracket 3 against the horn spring 13, causing the horn contact mechanism 16 to close the contact points 15 provided on the horn bracket 3 and the airbag housing 10 of the airbag module 8, respectively. This makes it possible to produce a horn sound. When the horn is deactivated, the horn spring 13 pushes back the airbag housing 10 toward the horn bracket 3, causing the horn contact mechanism 16 to open its contact.

According to the present embodiment, since the elastic bodies 17 of the dynamic damper, which are made of rubber or synthetic resin, are housed inside the protectors 18 in an elastically deformable manner and the protectors 18 are attached to the horn bracket 3, the elastic bodies 17 are protected by the protectors 18 from damage caused by surroundings unlike the background art. This increases durability of the elastic bodies 17 and makes the spring units 12 maintenance free.

Since each spring unit 12 is configured as an integral part, with the elastic body 17 being housed inside the protector 18 made of synthetic resin with high shape stability, the spring unit 12 can be attached to the horn bracket 3 via the protector 18, resulting in superior handleability compared to when the elastic body 17 is attached directly, improving assemblability, and increasing productivity.

Since plural spring units 12 are installed at intervals in the circumferential direction of the steering wheel 1, a dynamic damper which acts effectively along the entire circumference of the steering wheel 1 can be constructed with a simple configuration and ease of assembly without the need for such complex operations as used, for example, when an annular rubber ring and the like are mounted in an inner edge of the opening 6 in the horn bracket 3.

Since the protector 18 includes, as basic components, the outside shell 21 provided with the first planar portion 35 and the inner slider 22 provided with the second planar portion 37 and configured to be slidable with respect to the outside shell 21, the elastic body 17 can be assembled in an elastically deformable manner using the slidable inner slider 22 while protecting the elastic body 17 by the outside shell 21, and the spring unit 12 which serves the function of protecting the elastic body 17 can be constructed with an extremely simple structure.

Since the elastic body 17 is supported by the first and second planar portions 35 and 37 by dividing the outside shell 21 into the shell piece 23 adapted to hold the elastic body 17, and the holder piece 24 configured to form the first planar portion 35 and restraining the inner slider 22 to the holder piece 24 using the restraining mechanism made up of the bent portion 40 and the restraining hooks 41, the spring unit 12 can be assembled easily by the operations of sandwiching the elastic body 17 between the holder piece 24 and the first and second planar portions 35 and 37 of the inner slider 22 with the elastic body 17 held by the shell piece 23 in advance and subsequently restraining the holder piece 24 and inner slider 22 using the restraining mechanism. Also, the interval between the first and second planar portions 35 and 37 can be set using the restraining mechanism and the initial compression load applied to the elastic body 17 can be set appropriately through adjustments of the restraining mechanism.

Since the shell piece 23 is formed into a hollow circular cylindrical body which surrounds the elastic body 17 and the engagement flanges 19 adapted to sandwich the shell piece 23 are formed on opposite ends of the elastic body 17 to hold the elastic body 17 to the shell piece 23 via the engagement flanges 19, the elastic body 17 can be fixed to the shell piece 23 and thus to the protector 18 using a simple structure.

Since the elastic body 17 is formed into a hollow circular cylindrical body and the restraining mechanism includes the bent portion 40 formed on the inner slider 22 and extended to the side of the first planar portion 35 by penetrating the inner part of the elastic body 17 and the restraining hooks 41 formed at a tip of the bent portion 40 and restrained to the holder piece 24, the restraining mechanism of the inner slider 22 and holder piece 24 can be contained in the elastic body 17, making the spring unit 12 compact.

In the structure in which the airbag module 8 is mounted in the horn cover 7 used to operate the horn, since the spring resting surface 38 is formed additionally on each spring unit 12 attached to the horn bracket 3 and the horn spring 13 is installed between the spring resting surface 38 and airbag housing 10, the dynamic damper and horn operating mechanism can be installed on the steering wheel 1 with high apace efficiency.

Since the horn spring 13 is installed by being laid over the spring resting surfaces 38 formed on the spring units 12, each of which is a part integrated with the elastic body 17 by incorporating the elastic body 17, the horn spring 13 and elastic bodies 17 can be configured as a serial spring system. Consequently, the elastic characteristics of the horn spring 13 involved in the operation of the horn and elastic characteristics of the elastic bodies 17 making up the dynamic damper can be adjusted separately and independently of each other.

Since the guide hole 50 is formed by penetrating the inner slider 22 of the spring unit 12 and the guide stem 45 making up the horn operating mechanism is mounted using the guide hole 50, the horn operating mechanism can be incorporated into the spring units 12 extremely effectively thanks also to the mounting of the horn spring 13 on the spring resting surfaces 38. This makes it possible to simplify the steering wheel structure as well as to improve the efficiency of assembly operations by integrating part of the assembly operation of the steering wheel 1 into the assembly operation of the spring units 12. Also, the elastic deformation of the horn spring 13 can be guided appropriately during operation of the horn, thereby ensuring stable operability of the horn.

Since the rotation limiting mechanism made up of the notches 20 and limiting protrusions 28 and adapted to limit the rotation of the elastic body 17 in the protector 18 is installed between the shell piece 23 of the protector 18 and elastic body 17, the vibrations of the steering wheel 1 can be attenuated precisely by fixing the location of the elastic body 17 relative to the protector 18.

Since the mounting holes 14 are formed in the horn bracket 3, allowing the spring unit 12 to be mounted rotatably along the inner edge of each mounting hole 14, if the spring unit 12 has an orientation, such as when an elasticity setting of the elastic body 17 has an orientation, the spring unit 12 can be attached to the horn bracket 3 by being oriented accordingly.

Since the grip mechanism made up of the gripping strips 29 and the large-diameter portion 26 and adapted to grip the horn bracket 3 is installed on the shell piece 23 of the protector 18, the spring unit 12 rotatably mounted in each mounting hole 14 can be fixed reliably to the horn bracket 3 via the protector 18.

Since the positioning mechanism adapted to position the spring unit 12 by blocking rotation of the spring unit 12 is installed between the shell piece 23 of the protector 18 and horn bracket 3, the spring unit 12 rotatably mounted in each mounting hole 14 can be positioned in appropriate orientation.

When the grip mechanism adapted to grip the horn bracket 3 via the mounting hole 14 is formed, jutting outward from the inner edge of the mounting hole 14, i.e., toward the horn bracket 3, in such a way as to be rotatable along the inner edge of the mounting hole 14, since the insertion slots 44 for use to insert the grip mechanism are formed in the mounting hole 14 by expanding the mounting hole 14 outward from the inner edge of the mounting hole 14, the grip mechanism can be attached to the horn bracket 3 easily and the horn bracket 3 can be gripped reliably by the grip mechanism, improving the ease and efficiency of the operation of attaching the spring unit 12 to the horn bracket 3.

When the horn bracket 3 is gripped by the grip mechanism while the spring unit 12 is rotated in the mounting hole 14, since the positioning mechanism is made up of the positioning strips 30 and the stopper slots 34, the positioning strips 30 being formed by jutting from the shell piece 23 of the protector 18 further outward than the inner edge of the mounting hole 14 and configured to be slidable along the inner edge of the mounting hole 14 through elastic deformation while the stopper slots 34 being formed in the mounting hole 14 by expanding the mounting hole 14 outward from the inner edge of the mounting hole 14 and adapted to stop the slidable positioning strips 30 by getting engaged with the positioning strips 30, when the positioning strips 30 reach the stopper slots 34 through rotation of the spring unit 12, a positioning effect can be obtained automatically, making it possible to attach the spring unit 12 very simply and reliably to the horn bracket 3 in an appropriate orientation.

Since the stopper mechanism made up of the first and second stopper units 42 and 43 and adapted to limit the amount of compressive deformation of the elastic body 17 is provided between the outside shell 21 adapted to support opposite ends of the elastic body 17 and the inner slider 22 configured to be slidable with respect to the outside shell 21, the durability of the elastic body 17 can be increased and the spring unit 12 can be made maintenance free.

Regarding the spring unit 12, the elastic body 17 may be integrally joined to the outside shell 21 or shell piece 23 of the protector 18 using an adhesive or the like. This will eliminate the need to install the engagement flanges 19. The elastic body 17 may be integrally joined to the inner slider 22 using an adhesive or the like. Thus, the elastic body 17 may be integrally joined to the inner slider 22 as well as to the outside shell 21 or shell piece 23 using an adhesive or the like. If the elastic body 17 is integrally joined to the shell piece 23 and inner slider 22, the holder piece 24 may be omitted.

Figure 9:
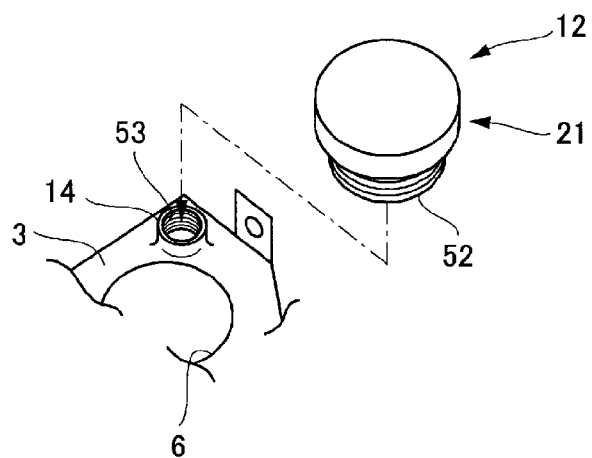
FIG. 9 is a perspective view showing a variation of a spring unit attaching structure applied to the steering wheel structure with an airbag module according to the present invention.

FIG. 9 shows a variation of a mounting structure used to mount the spring unit 12 on the horn bracket 3. According to the present variation, a screw-type spring unit 12 is mounted by forming a male thread 52 on the outside shell 21 of the protector 18 of the spring unit 12, forming a collar around the mounting hole 14 in the horn bracket 3 by a flanging process, and forming a female thread 53 in the mounting hole 14 instead of using the grip mechanism described above.

Figure 10:
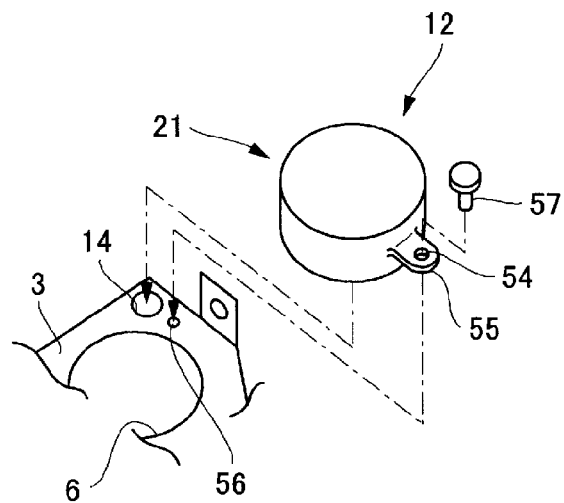
FIG. 10 is a perspective view showing a variation of a spring unit positioning structure applied to the steering wheel structure with an airbag module according to the present invention.

FIG. 10 shows a variation of a positioning structure used to position the spring unit 12 on the horn bracket 3. According to the present variation, instead of using the positioning mechanism described above, a lug 55 provided with an engagement hole 54 is formed on the protector 18 of the spring unit 12, a positioning hole 56 is formed in the horn bracket 3, and a pin 57 is passed through the engagement hole 54 and positioning hole 56 for positioning.

Figure 11:
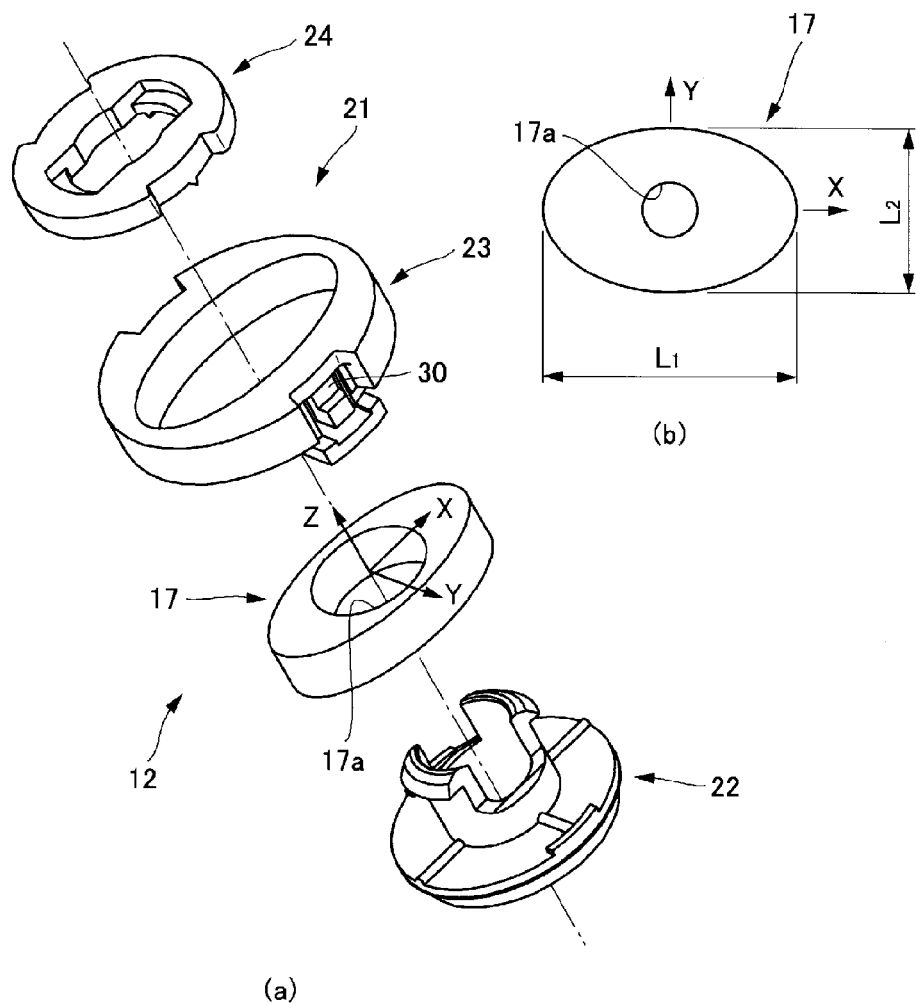
FIGS. 11(a) and 11(b) are explanatory diagrams illustrating a variation of an elastic body applied to the steering wheel structure with an airbag module according to the present invention.
Figure 12:
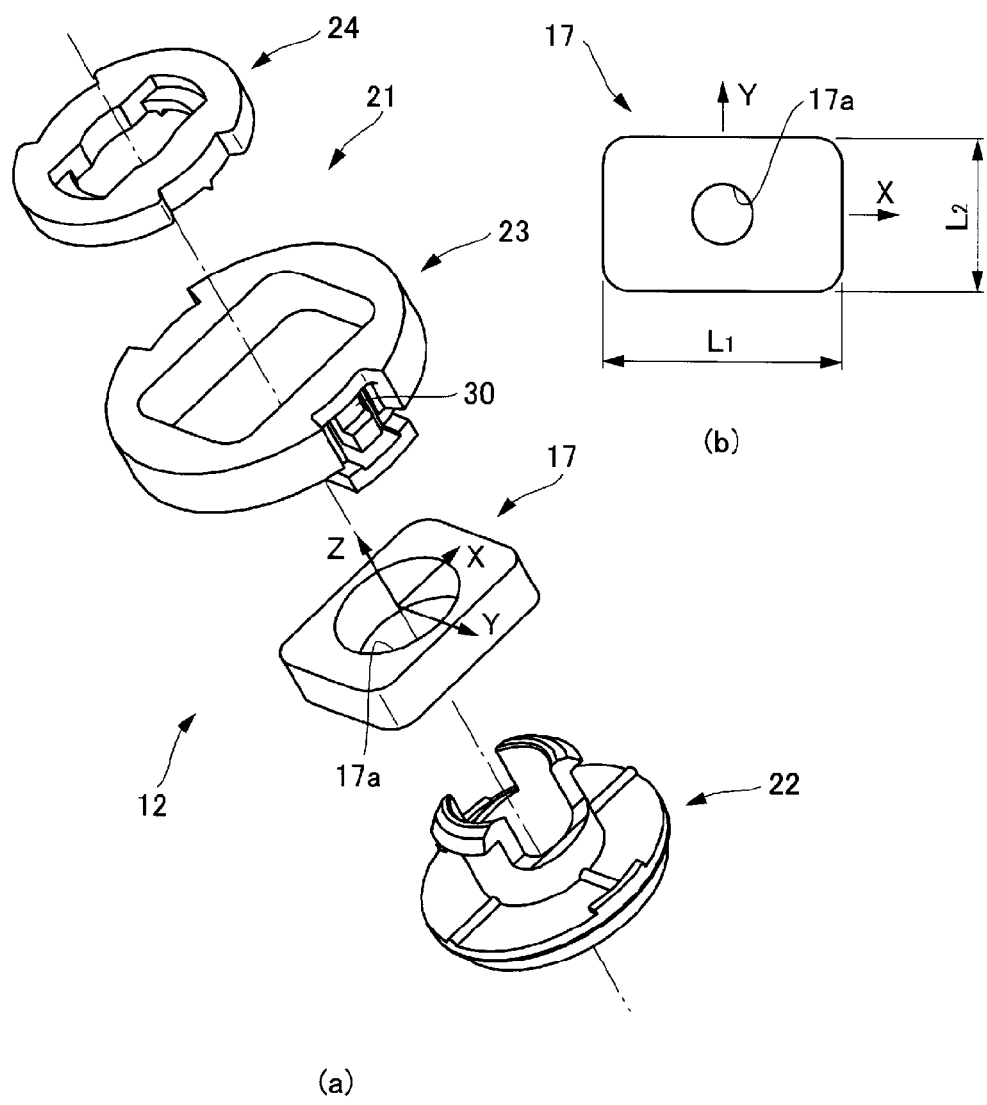
FIGS. 12(a) and 12(b) are explanatory diagrams illustrating another variation of an elastic body applied to the steering wheel structure with an airbag module according to the present invention.
Figure 13:
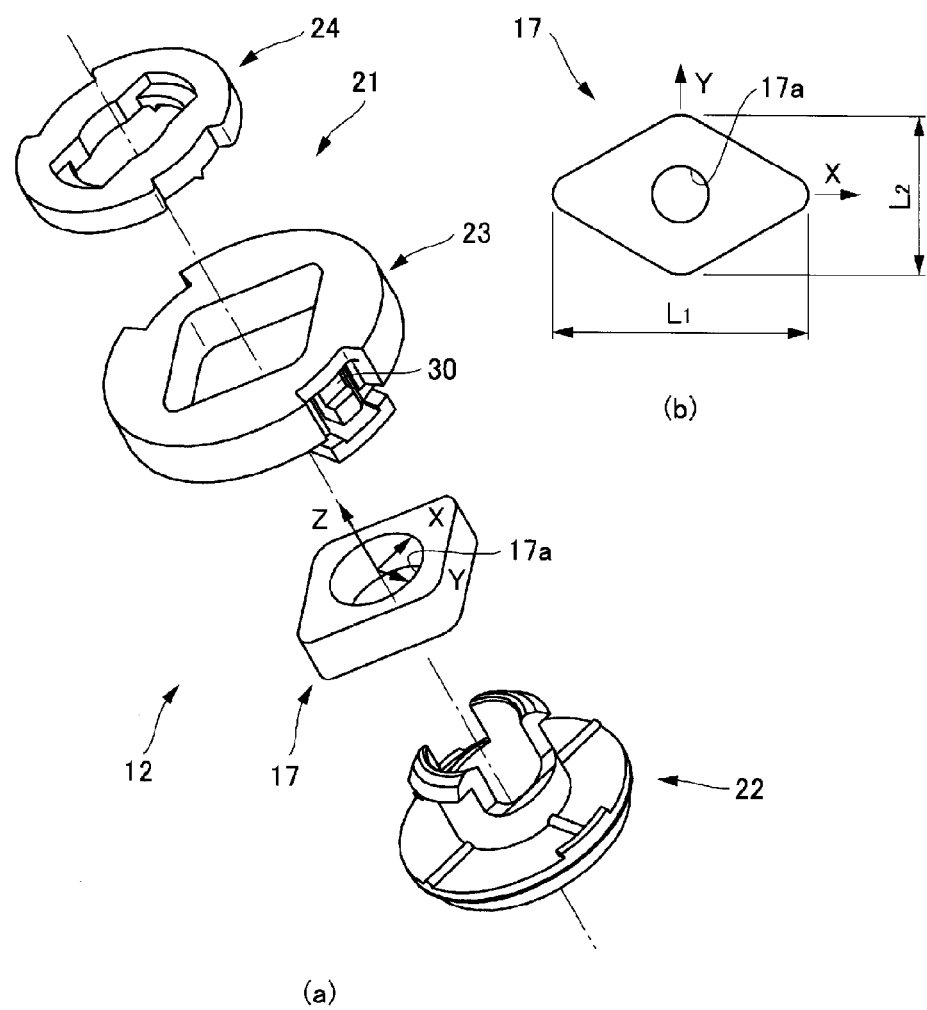
FIGS. 13(a) and 13(b) are explanatory diagrams illustrating still another variation of an elastic body applied to the steering wheel structure with an airbag module according to the present invention.

FIGS. 11 to 13 show variations of the elastic body 17. The shell pieces 23 and elastic bodies 17 are illustrated schematically. In the embodiment described above, the elastic body 17 is formed into a hollow circular cylindrical body or a ring-shaped body with a uniform radial thickness in the circumferential direction (circumferentially about the elastic body 17) and configured to produce a uniform elastic action in the up-and-down direction and left-to-right direction of the steering wheel 1. In contrast, according to the variations shown in FIGS. 11 to 13, the elastic bodies 17 have different elastic characteristics between the up-and-down direction and left-to-right direction of the steering wheel 1.

In FIGS. 11 to 13, arrow X indicates the up-and-down direction of the steering wheel 1, arrow Y indicates the left-to-right direction of the steering wheel 1, and arrow Z indicates the forward and backward direction of the steering wheel 1. The up-and-down direction and left-to-right direction may be exchanged, with arrow Y representing the former and arrow X representing the latter.

FIG. 11(*a*) is an exploded perspective view of the spring unit 12 and FIG. 11(*b*) is a plan view of the elastic body 17, wherein the external contour of the elastic body 17 has an elliptical shape with the direction of arrow X corresponding to a major axis $L_1$ and the direction of arrow Y corresponding to a minor axis $L_2$. An inner circumferential surface of the shell piece 23 is formed into an elliptical shape to conform to the external contour of the elastic body 17. On the other hand, the through-hole 17*a* formed in the center of the elastic body 17 has a circular shape with a fixed radius. Therefore, the elastic body 17 increases or decreases in radial thickness in the circumferential direction (circumferentially about the elastic body 17), resulting in larger bulk in the arrow X direction than in the arrow Y direction. Consequently, the elastic body 17 has different elastic characteristics between the up-and-down direction and left-to-right direction of the steering wheel 1, providing different damping actions.

FIG. 12(*a*) is an exploded perspective view of the spring unit 12 and FIG. 12(*b*) is a plan view of the elastic body 17, wherein the external contour of the elastic body 17 has a rectangular shape with the direction of arrow X corresponding to a longer dimension $L_1$ and the direction of arrow Y corresponding to a shorter dimension $L_2$. An inner circumferential surface of the shell piece 23 is formed into a rectangular shape to conform to the external contour of the elastic body 17. Even in this form, the elastic body 17 increases or decreases in radial thickness in the circumferential direction (circumferentially about the elastic body 17). Consequently, the elastic body 17 can have different elastic characteristics between the up-and-down direction and left-to-right direction of the steering wheel 1, providing different damping actions, as in the case of FIG. 11.

FIG. 13(*a*) is an exploded perspective view of the spring unit 12 and FIG. 13(*b*) is a plan view of the elastic body 17, wherein the external contour of the elastic body 17 has a rhombic shape with the direction of arrow X corresponding to a longer diagonal dimension $L_1$ and the direction of arrow Y corresponding to a shorter diagonal dimension $L_2$. An inner circumferential surface of the shell piece 23 is formed into a rhombic shape to conform to the external contour of the elastic body 17. Even in this form, the elastic body 17 can have different elastic characteristics between the up-and-down direction and left-to-right direction of the steering wheel 1, providing different damping actions, as in the case of FIGS. 11 and 12.

If the elastic body 17 has different elastic characteristics between the up-and-down direction and left-to-right direction of the steering wheel 1 as with the above variations, the elastic characteristics in the up-and-down direction of the steering wheel 1 and the elastic characteristics in the left-to-right direction of the steering wheel 1 can be adjusted arbitrarily and appropriately.

In this case, if each spring unit 12 set by the positioning mechanism made up of the positioning strips 30 and stopper slots 34 with respect to the horn bracket 3 is oriented according to the elastic characteristics of the elastic body 17, dynamic damping characteristics can be set and adjusted easily and precisely for the steering wheel 1.

Also, the elliptical, rectangular, or rhombic elastic body 17 shown in the above variations and the shell piece 23 adapted to house the elastic body 17 can make up a rotation limiting mechanism for limiting the rotation of the elastic body 17 in the protector 18.

Figure 14:
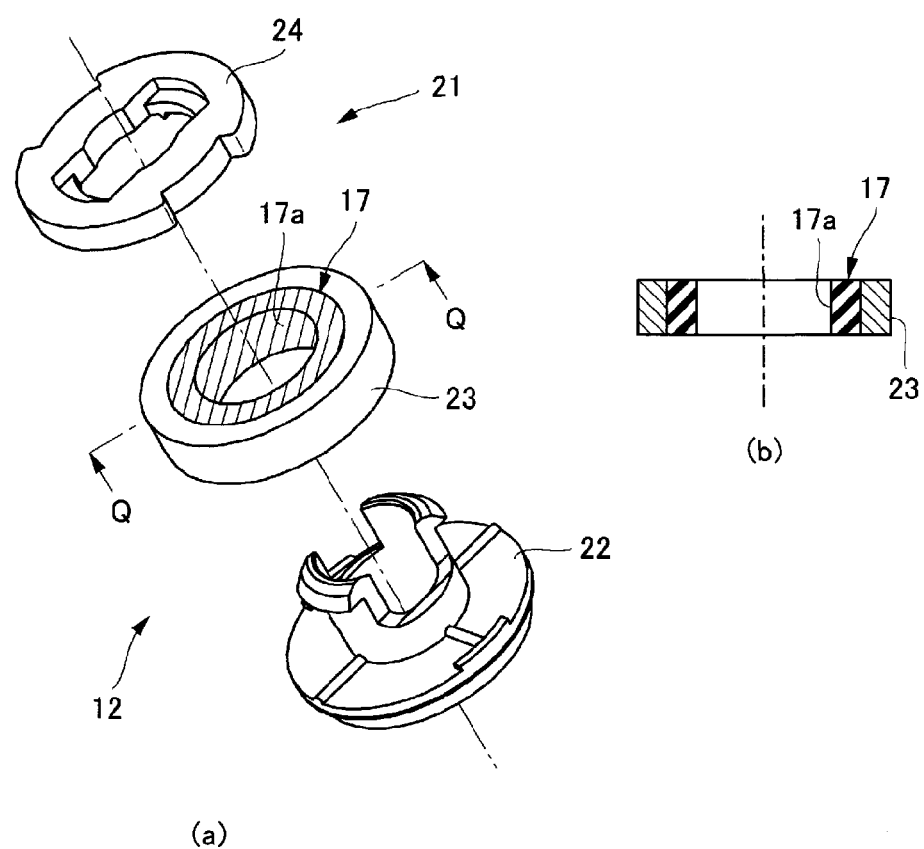
FIGS. 14(a) and 14(b) are explanatory diagrams illustrating a variation of assembly procedures for assembling the elastic body to a protector in the steering wheel structure with an airbag module according to the present invention.
Figure 15:
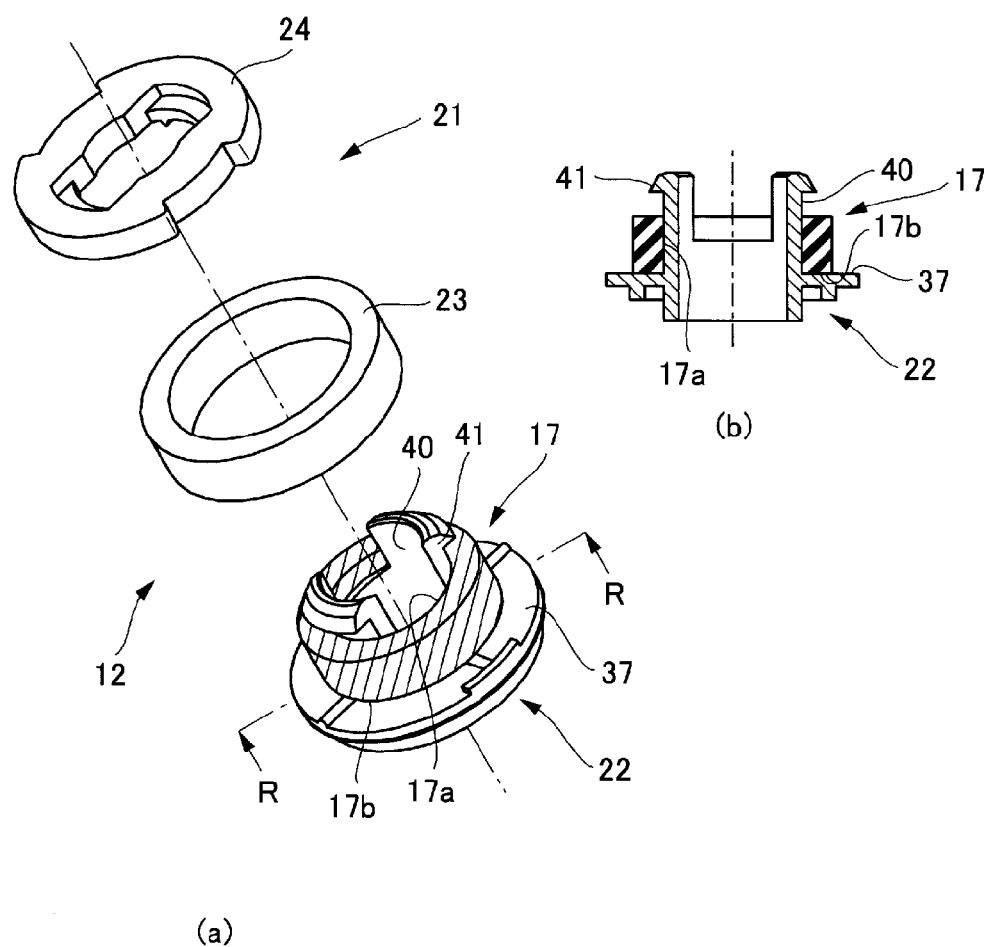
FIGS. 15(a) and 15(b) are explanatory diagrams illustrating another variation of assembly procedures for assembling the elastic body to a protector in the steering wheel structure with an airbag module according to the present invention.

FIGS. 14 and 15 show variations of assembly procedures for assembling the elastic body 17 to the protector 18. According to these variations, the elastic body 17 is integrally joined to the protector 18 by a joining method such as bonding or welding.

Specifically, FIG. 14(*a*) is an exploded perspective view of the spring unit 12 and FIG. 14(*b*) is a sectional arrow view taken in the direction of line Q-Q in FIG. 14(*a*), wherein the elastic body 17 is installed integrally with the outside shell 21 of the protector 18, with an outer circumferential surface of the elastic body 17 being joined to the inner circumferential surface of the shell piece 23. This simplifies the operation of assembling the elastic body 17 to the protector 18.

FIG. 15(*a*) is an exploded perspective view of the spring unit 12 and FIG. 15(*b*) is a sectional arrow view taken in the direction of line R-R in FIG. 15(*a*), wherein the elastic body 17 is installed integrally with the inner slider 22 of the protector 18, with one end face (the ring-shaped end face in the lower end in the illustrated example) 17*b* of the elastic body 17 being joined to the second planar portion 37 of the inner slider 22. Even with this configuration, it is possible to simplify the operation of assembling the elastic body 17 to the protector 18.

These variations also provide operation and effects similar to those of the above embodiment.

Although in the above embodiment, a case in which the spring units 12 are attached to the horn bracket 3 has been described by way of example, needless to say, the spring units 12 may be attached to the airbag module 8 instead of the horn bracket 3.

The steering wheel structure with an airbag module described above is a preferred example of the present invention, and other exemplary embodiments can be implemented or carried out by various methods. In particular, the present invention is not limited to the detailed shapes, sizes, configurations, and layouts of the parts shown in the accompanying drawings unless otherwise specified herein. Also, the expressions and terms used herein are intended for illustrative purposes only, and are not restrictive unless otherwise specified.

The invention claimed is:

1. A steering wheel structure with an airbag module comprising: a horn bracket fixed to a steering wheel; an airbag module having an inflator and serving as a weight; a spring unit installed between the airbag module and the horn bracket and adapted to transmit vibrations of the steering wheel to the airbag module for configuring a dynamic damper, wherein
the spring unit includes an elastic body adapted to transmit the vibrations, and a protector made of synthetic resin, the protector being directly attached to one of the horn bracket and the airbag module, and the protector elastically deformably housing the elastic body.

2. The steering wheel structure with an airbag module according to claim 1, further comprising a plurality of the spring units disposed at spaced intervals in a circumferential direction of the steering wheel structure.

3. The steering wheel structure with an airbag module according to claim 2, wherein the protector includes an outer shell surrounding the elastic body and having a first planar portion supporting one end of the elastic body, and an inner slider installed slidably in the outer shell and having a second planar portion supporting another end of the elastic body.

4. The steering wheel structure with an airbag module according to claim 2, wherein the elastic body has a non-uniform radial thickness circumferentially about the elastic body thereby providing different elastic characteristics between up-and-down direction and left-to-right direction of the steering wheel.

5. The steering wheel structure with an airbag module according to claim 4, wherein the protector includes an outer shell surrounding the elastic body and having a first planar portion supporting one end of the elastic body, and an inner slider installed slidably in the outer shell and having a second planar portion supporting another end of the elastic body.

6. The steering wheel structure with an airbag module according to claim 5, wherein:
the outer shell includes a shell piece holding the elastic body, and a holder piece forming the first planar portion; and
a restraining finger retaining the inner slider with the holder piece, the restraining finger extending between and being connected to the holder piece and to the inner slider, which respectively support opposite ends of the elastic body on the first planar portion and the second planar portion.

7. The steering wheel structure with an airbag module according to claim 6, wherein the shell piece is formed as a hollow cylindrical body surrounding the elastic body; and the elastic body being held to the shell piece via engagement flanges formed on opposite ends of the elastic body, the shell piece being sandwiched between the engagement flanges.

8. The steering wheel structure with an airbag module according to claim 7, wherein
the elastic body is formed as a hollow cylindrical body; and
the restraining finger is flexible and deformable and is formed on the inner slider, the restraining finger extending to the side of the first planar portion by penetrating an inner part of the elastic body, and the restraining finger including a hook formed at an end thereof and engaged with the holder piece.

9. The steering wheel structure with an airbag module according to claim 6, wherein the elastic body is formed as a hollow cylindrical body; and the restraining finger is flexible and deformable and is formed on the inner slider, the restraining finger extending to the side of the first planar portion by penetrating an inner part of the elastic body, and the restraining finger including a hook formed at an end thereof and engaged with the holder piece.

10. The steering wheel structure with an airbag module according to claim 1, further comprising: a horn cover fitted with the airbag module and being moveable toward the horn bracket when a horn is operated; a horn contact mechanism installed between the airbag module and the horn bracket and adapted to produce a horn sound when the horn contact is closed; a spring resting surface installed on the protector and attached to one of the horn bracket and the airbag module; and a horn spring installed between the spring resting surface and the other of the horn bracket and the airbag module, the horn spring being elastically deformable to close the horn contact mechanism when the horn is operated while biasing the horn contact mechanism in an opening direction.

11. The steering wheel structure with an airbag module according to claim 10, further comprising: a guide hole formed along a biasing direction of the horn spring by penetrating the spring unit attached to one of the horn bracket and the airbag module; and a guide stem slidably passed through the guide hole, the guide stem having one end detachably restrained to the spring unit and another end coupled to the other of the horn bracket and the airbag module, the guide stem configured to guide elastic deformation of the horn spring while sliding in the guide hole.

12. The steering wheel structure with an airbag module according to claim 1, wherein the elastic body has a non-uniform radial thickness circumferentially about the elastic body thereby providing different elastic characteristics between up-and-down direction and left-to-right direction of the steering wheel.

13. The steering wheel structure with an airbag module according to claim 1, wherein the protector includes an outer shell surrounding the elastic body and having a first planar portion supporting one end of the elastic body, and an inner slider installed slidably in the outer shell and having a second planar portion supporting another end of the elastic body.

14. The steering wheel structure with an airbag module according to claim 1, wherein the protector includes an outer shell surrounding the elastic body, the outer shell including a mounting structure configured to directly mount the outer shell to the one of the airbag module and the horn bracket.

15. The steering wheel structure with an airbag module according to claim 14, wherein the mounting structure includes a gap receiving therein the one of the airbag module and the horn bracket, the gap being defined between a lip projecting from the outer shell and an outer diameter portion of the shell.

16. A steering wheel structure with an airbag module comprising:
a steering wheel;
an airbag module having an inflator and serving as a weight; and
a spring unit engaged with the airbag module and adapted to transmit vibrations of the steering wheel to the airbag module for configuring a dynamic damper, the spring unit including an elastic body adapted to transmit the vibrations and a protector made of synthetic resin, the protector being directly attached to the airbag module, and the protector elastically deformably housing the elastic body.

17. The steering wheel structure with an airbag module according to claim 16, further comprising a horn bracket fixed to the steering wheel, the spring unit being connected between the airbag module and the horn bracket, and the protector also being attached to the horn bracket.

* * * * *